(12) United States Patent
Chen

(10) Patent No.: US 9,154,037 B2
(45) Date of Patent: Oct. 6, 2015

(54) CURRENT-MODE BUCK CONVERTER AND ELECTRONIC SYSTEM USING THE SAME

(71) Applicant: ANPEC ELECTRONICS CORPORATION, Hsinchu (TW)

(72) Inventor: Chih-Ning Chen, Taipei (TW)

(73) Assignee: Anpec Electronics Corporation, Hsinchu (TW)

( * ) Notice: Subject to any disclaimer, the term of this patent is extended or adjusted under 35 U.S.C. 154(b) by 127 days.

(21) Appl. No.: 14/064,277

(22) Filed: Oct. 28, 2013

(65) Prior Publication Data

US 2015/0028830 A1    Jan. 29, 2015

(30) Foreign Application Priority Data

Jul. 29, 2013  (TW) ............................... 102127079 A

(51) Int. Cl.
*H02M 3/158* (2006.01)
*H02M 3/156* (2006.01)
*H02M 1/00* (2007.01)

(52) U.S. Cl.
CPC ............ *H02M 3/1588* (2013.01); *H02M 3/156* (2013.01); *H02M 3/158* (2013.01); *H02M 2001/0025* (2013.01); *H02M 2001/0032* (2013.01)

(58) Field of Classification Search
CPC ... H02M 3/156; H02M 3/158; H02M 3/1588; H02M 2001/0025; H02M 2001/0032
See application file for complete search history.

(56) References Cited

U.S. PATENT DOCUMENTS

| 6,828,766 | B2 * | 12/2004 | Corva et al. .................... | 323/284 |
| 2010/0066328 | A1 | 3/2010 | Shimizu et al. | |
| 2011/0050185 | A1 | 3/2011 | Notman et al. | |
| 2011/0148371 | A1 | 6/2011 | Huang et al. | |
| 2011/0241641 | A1 | 10/2011 | Chen et al. | |
| 2011/0316505 | A1 * | 12/2011 | Shrivastava .................... | 323/282 |

FOREIGN PATENT DOCUMENTS

| CN | 101630906 B | 11/2011 |
| CN | 102714462 A | 10/2012 |
| TW | 201123700 A | 7/2011 |
| TW | 201136119 A | 10/2011 |

* cited by examiner

*Primary Examiner* — Fred E Finch, III
*Assistant Examiner* — Rafael O De Leon Domenech
(74) *Attorney, Agent, or Firm* — Rosenberg, Klein & Lee

(57) ABSTRACT

A current-mode buck converter is disclosed, wherein the current-mode buck converter operates in a pulse width modulation (PWM) mode or a pulse frequency modulation (PFM) mode. When the current-mode buck converter enters into the PFM mode, the voltage level of the parking voltage is maintained at the voltage level of compensation voltage, so as to decrease switch loss of the current-mode buck converter operating between PWM mode and PFM mode, and stabilize the output voltage of the current-mode buck converter.

18 Claims, 3 Drawing Sheets

CURRENT-MODE BUCK CONVERTER AND ELECTRONIC SYSTEM USING THE SAME

BACKGROUND OF THE INVENTION

1. Field of the Invention

The instant disclosure relates to a current-mode buck converter; in particular, to current-mode buck converter smoothly switched between a pulse width modulation mode and a pulse frequency modulation mode.

2. Description of Related Art

The electronic device usually comprises different components, and operating voltages of each component are different. Therefore, the electronic device is able to achieve regulation of the voltage level through a DC-to-DC voltage conversion circuit, and make the voltage be stabilized at a preset voltage value. According to different power requirements, it may be extended to many different types of DC-DC voltage conversion circuit, e.g. Buck/Step Down Converter and Boost/Step Up Converter. Furthermore, buck/step down converter may make the DC voltage of the input terminal decrease to a preset voltage level, and boost/step up converter may elevate DC voltage of the input terminal. There are many case of buck/step down converter or boost/step up converter has already evolved for adapting different architecture or meeting different demands as evolution of the circuit technology.

For example, referring to FIG. 1, FIG. 1 shows circuit schematic view of the current-mode buck converter according to prior art. The current-mode buck converter comprises an oscillator 110, an input terminal IT', an output terminal OT', a feedback module 160, a switch module 150, a current detecting circuit 130, a slope compensating circuit 140, a detection resistor RU, an error amplifier E1' a modulation compensating circuit 170, a first comparator COP1', a modulation control circuit 120, a zero-crossing detecting circuit ZT', a current source ISET and a resistor RS. The modulation compensating circuit 170 comprises a compensation switch S1', a compensation resistor ROP' and a compensation capacitor COP'. The feedback module 160 comprises a first resistor R1' and a second resistor R2'. The switch module 150 comprises a buffer amplifier 152, an up-bridge switch transistor MP' and a down-bridge switch transistor MN', wherein the up-bridge switch transistor MP' is a P type metal-oxide semiconductor transistor and the down-bridge switch transistor MN' is an N type metal-oxide semiconductor transistor.

In prior art, the current-mode buck converter 100 receives an input voltage VIN' via an input terminal IT', and outputs an output voltage VOUT' via an output terminal OT'. The feedback module 160 generates a feedback signal VFB' according to the output voltage VOUT'. The switch module 150 determines an electrical connection of the input terminal IT', a ground voltage GND' and the output terminal OT' according to a next-stage switch signal SWB'. The current detecting circuit 130 amplifies an input current ISNP' received so as to generate an image current ISP'. The slope compensating circuit 140 receives a pre-stage switch signal SW' and operates correspondingly according to the pre-stage switch signal SW', and then generates a slope compensating current ISC' accordingly. The current-mode buck converter 100 gather the image current ISP' and the slope compensating current ISC' via an adder AD' and then it flows into one terminal of the detection resistor RU so as to generate a detection voltage VC'. The detection voltage VC' is electrically connected to an input terminal of the first comparator COP1'. The error amplifier E1' is used for amplifying a difference of the feedback signal VFB' and the first reference voltage VREF1' so as to generate a difference voltage ΔV'. The modulation compensating circuit 170 compensates frequency response of the current-mode buck converter 100 according to the difference voltage ΔV', and accordingly generates a compensation voltage EAO', wherein one terminal of the compensation switch S1' of the modulation compensating circuit 170 is switched and connected to one of the PWM terminal T1' and the PFM terminal T2' according to a mode switch signal PF'. The first comparator COP1' receives the detection voltage VC' and the compensation voltage EAO' and compares the detection voltage VC' with the compensation voltage EAO', so as to the PWM signal PS'. The modulation control circuit 120 is used for generating the pre-stage switch signal SW' according to the PWM signal PS' and the oscillation signal VOSC', wherein the oscillation signal VOSC' is generated from the oscillator 110. The zero-crossing detecting circuit ZT' is used for detecting a source current ISNN' of the down-bridge switch transistor MN', and transmits the mode switch signal PF' to the modulation control circuit 120, the compensation switch S1', the current detecting circuit 130 and the slope compensating circuit 140 according to a detection result.

However, when the current-mode buck converter 100 is changed from the pulse width modulation (PWM) mode to the pulse frequency modulation (PFM) mode, one terminal of the compensation switch S1' is switched and connected to the PFM terminal T2' from the PWM terminal T1' so as to receive a constant voltage FV. Because, a fixed current is generated from the current source ISET, a constant voltage FV is generated at the PFM terminal T2' when the fixed current flows through a fixed resistor RS, wherein the constant voltage FV does not carry any information about the detection voltage VC' and the compensation voltage EAO'. Accordingly, when the current-mode buck converter 100 is switched between the PFM mode and the PWM mode, the output voltage VOUT' will be not stable or be oscillated between the PFM mode and the PWM mode.

SUMMARY OF THE INVENTION

The instant disclosure provides a current-mode buck converter. The current-mode buck converter comprises an oscilator, an input terminal, an output terminal, a feedback module, a switch module, a current detecting circuit, a slope compensating circuit, a detection resistor, an error amplifier, a modulation compensating circuit, a first comparator, a second comparator, a modulation control circuit, a zero-crossing detecting circuit and a buffer. The modulation compensating circuit comprises a compensation switch, a compensation resistor and a compensation capacitor. The oscillator is used for generating an oscillation signal. The input terminal is used for receiving an input voltage. The output terminal is used for receiving an output voltage. The feedback module is connected to the output terminal, and the feedback module is used for generating a feedback signal according to the output voltage. The switch module is used for determining an electric connection of the input terminal, ground voltage and the output terminal according to a next-stage switch signal. The current detecting circuit is connected to the input terminal so as to receive an input current, and is used for generating an image current. The slope compensating circuit is used for receiving a pre-stage switch signal and accordingly generating a slope compensating current. One terminal of the detection resistor is connected to the current detecting circuit and the slope compensating circuit for transforming a sum of the image current and the slope compensating current to a detection voltage. The error amplifier is connected to the feedback module for amplifying a difference of the feedback signal and a first reference voltage so as to generate a difference voltage. The modulation compensating circuit is connected to the error amplifier for compensating frequency response of the current-mode buck converter according to the difference voltage and then generating a compensation voltage. A control terminal of the compensation switch receives a mode switch signal and accordingly makes one terminal of the compensation switch be switched to one of a PWM terminal and a PFM terminal. One terminal of the compensation resistor is connected to another terminal of the compensation switch. A first terminal of the compensation capacitor is connected to another terminal of the compensation resistor, and a second terminal of the compensation capacitor is connected the ground voltage. The first comparator receives the detection voltage and compares the detection voltage with the compensation voltage so as to generate a PWM signal accordingly. The second comparator receives and compares the compensation voltage with a threshold voltage so as to generate and transmit a sleep-trigger signal to the current detecting circuit and the slope compensating circuit. The modulation control circuit is connected to the oscillator, the slope compensating circuit, the first comparator and the second comparator, for generating the pre-stage switch signal according to the PWM signal and the oscillation signal. The zero-crossing detecting circuit is connected to switch module for detecting current. The buffer receives the detection voltage and outputs the detection voltage to the PFM terminal. When the current-mode buck converter enters into a pulse frequency modulation mode from a pulse width modulation mode, one terminal of the compensation switch is switched and connected to the PFM terminal from the PWM terminal for receiving the detection voltage, and voltage level of the detection voltage is equal to voltage level of the compensation voltage at this time, and thus reduces switch loss of the current-mode buck converter and stabilizes a transition between the pulse frequency modulation mode and the pulse width modulation mode.

In an embodiment of the instant disclosure, wherein when current-mode buck converter is in the pulse width modulation mode, the zero-crossing detecting circuit outputs the mode switch signal with low voltage level to the modulation control circuit and the compensation switch, so that one terminal of the compensation switch is switched and connected to PWM terminal, and when the current-mode buck converter is in the pulse frequency modulation mode, the zero-crossing detecting circuit outputs the mode switch signal with high voltage level to the modulation control circuit and the compensation switch, so that one terminal of the compensation switch is switched and connected to the PFM terminal.

In an embodiment of the instant disclosure, wherein when the compensation voltage is smaller than the threshold voltage, the second comparator transmits the sleep-trigger signal with high voltage level to the current detecting circuit and the slope compensating circuit so as to shut down work.

In an embodiment of the instant disclosure, wherein the PWM signal is a signal generated by interacting peak value which is a sum of the compensation voltage, the image current and the slope compensating current.

In an embodiment of the instant disclosure, wherein the switch module comprises a buffer amplifier, a up-bridge switch transistor and a down-bridge switch transistor. The buffer amplifier is connected to the modulation control circuit for amplifying the pre-stage switch signal so as to generate the next-stage switch signal. The up-bridge switch transistor is connected to the input terminal and the buffer amplifier is used for receiving the next-stage switch signal. The down-bridge switch transistor is connected to the ground voltage and the buffer amplifier for receiving the next-stage switch signal, and the down-bridge switch transistor determines electric connection of the ground voltage and the output terminal according to an in-phase signal or an anti-phase signal.

In an embodiment of the instant disclosure, wherein the up-bridge switch transistor is a P type metal-oxide semiconductor transistor and the down-bridge switch transistor is an N type metal-oxide semiconductor transistor.

In an embodiment of the instant disclosure, wherein the feedback module comprises a first resistor and a second resistor. One terminal of the first resistor is connected to the output terminal for receiving the output voltage. One terminal of the second resistor is connected to another terminal of the first resistor and outputs the feedback signal to the error amplifier, and another terminal of the second resistor is connected to the ground voltage. Voltage of the feedback signal is partial voltage of the output voltage.

In an embodiment of the instant disclosure, wherein the modulation control circuit generates the pre-stage switch signal according to the PWM signal and the oscillation signal when the PWM signal is in high voltage level.

In an embodiment of the instant disclosure, wherein the threshold voltage is a fixed voltage.

The instant disclosure provides another electronic system. The electronic system comprises a current-mode buck converter and a load. The current-mode buck converter receives an input voltage and the input voltage is step down to output voltage. The load is connected to the current-mode buck converter for receiving the output voltage.

In summary, the current-mode buck converter and the electronic system using the same provided by the instant disclosure is able to reduce switch loss when the current-mode buck converter is switched between the pulse width modulation mode and the pulse frequency modulation mode, and the output voltage of the current-mode buck converter is stabilized.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

[One Embodiment of the Current-Mode Buck Converter]

Figure 1:
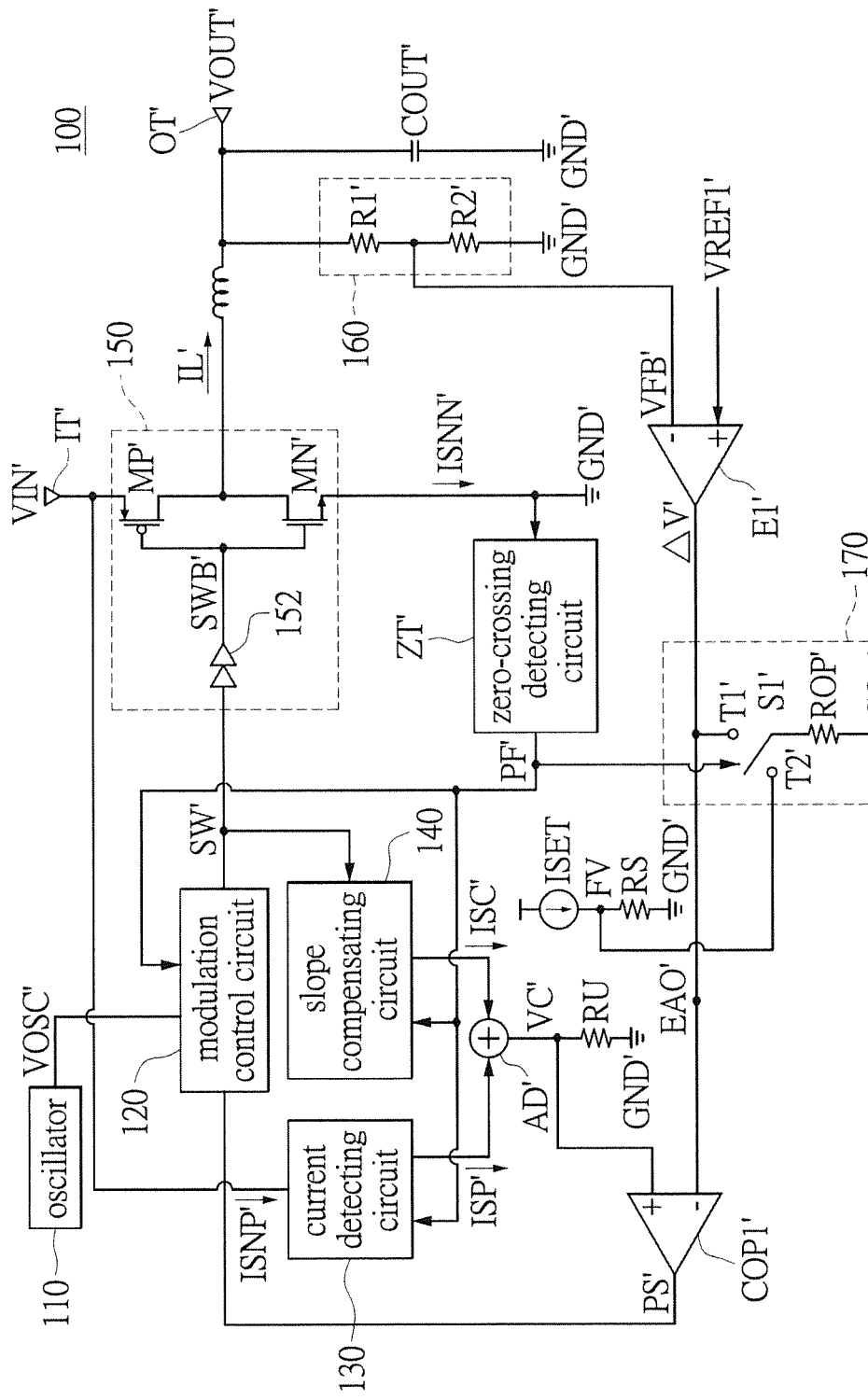
FIG. 1 shows circuit schematic view of the current-mode buck converter according to prior art.
Figure 2:
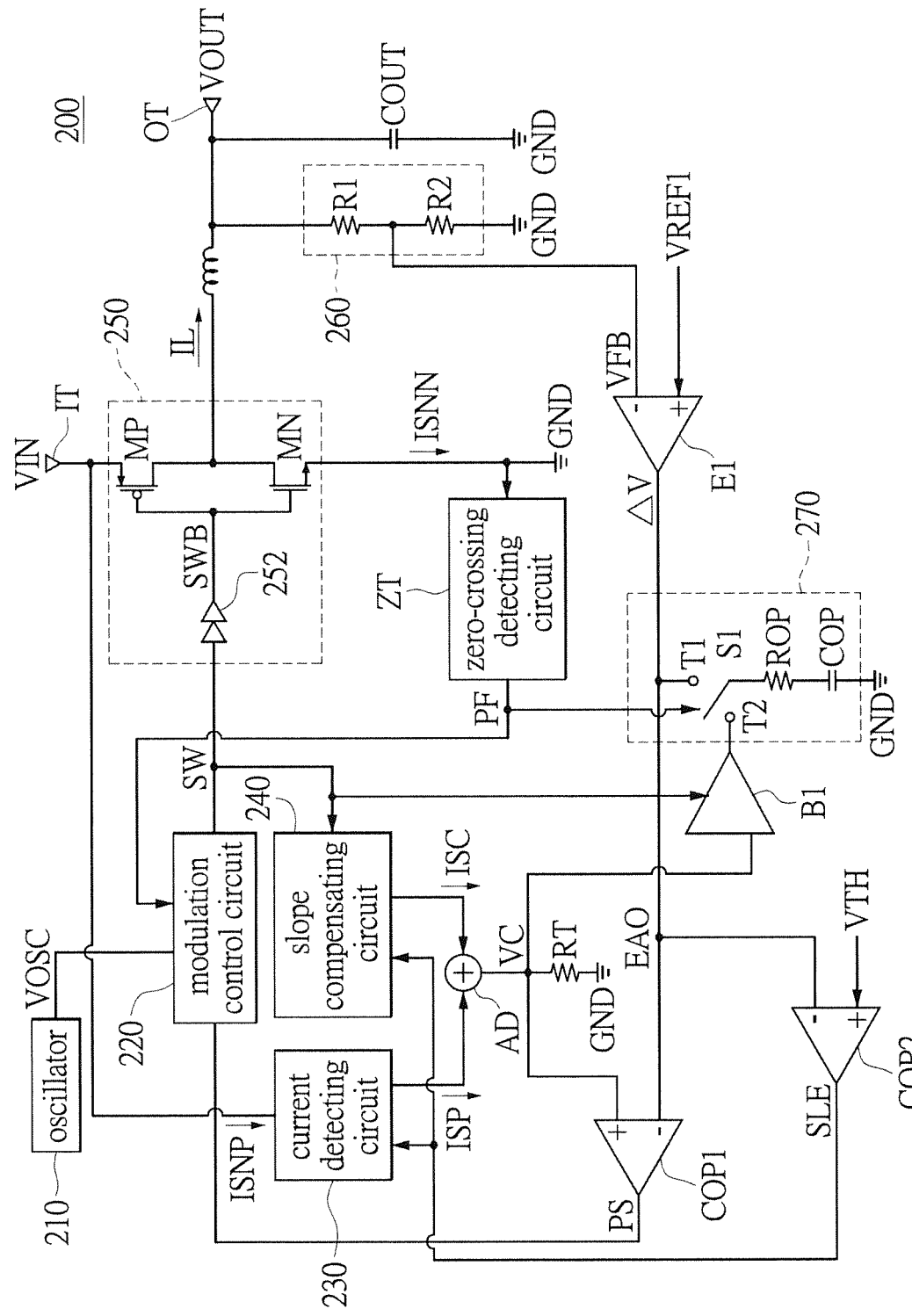
FIG. 2 shows a block schematic view of the current-mode buck converter according to the embodiment of the instant disclosure.

Referring to FIG. 2, FIG. 2 shows a block schematic view of the current-mode buck converter according to the embodiment of the instant disclosure. The current-mode buck converter 200 comprises an oscillator, an input terminal, an output terminal, a feedback module, a switch module, a current detecting circuit, a slope compensating circuit, a detection resistor, an error amplifier, a modulation compensating circuit, a first comparator, a second comparator, a modulation control circuit, a zero-crossing detecting circuit and a buffer. The modulation compensating circuit comprises a compensation switch, a compensation resistor and a compensation capacitor. The feedback module 260 comprises a first resistor R1 and a second resistor R2. The switch module 250 comprises a buffer amplifier 252, an up-bridge switch transistor MP and a down-bridge switch transistor MN, wherein the up-bridge switch transistor MP is a P type metal-oxide semiconductor transistor and the down-bridge switch transistor MN is an N type metal-oxide semiconductor transistor.

The oscillator 210 is connected to the modulation control circuit 220. The modulation control circuit 220 is electrically connected to the slope compensating circuit 240 and an input terminal of the buffer amplifier 252 in the switch module 250 respectively. The output terminal of the buffer amplifier 252 is electrically connected to gate of the up-bridge switch transistor MP and the down-bridge switch transistor MN respectively. Source of the up-bridge switch transistor MP is connected to the input terminal IT for receiving the input voltage VIN. Drain of the down-bridge switch transistor MN is electrically connected to drain of the up-bridge switch transistor MP, and output terminal OT. Source of the down-bridge switch transistor MN is connected to the ground voltage GND and the input terminal of the zero-crossing detecting circuit ZT. One terminal of the first resistor R1 is electrically connected to the output terminal OT and one terminal of the output capacitor COUT, and another terminal of the first resistor R1 is electrically connected to one terminal of the second resistor R2 and an negative input terminal of the error amplifier E1, and another terminal of the second resistor R2 is electrically connected to the ground voltage GND, wherein another terminal of the output capacitor COUT is electrically connected to the ground voltage GND. A positive input terminal of the error amplifier E1 receives a first reference voltage VREF1, and output terminal of the error amplifier E1 is electrically connected to a negative input terminal of the first comparator COP1, wherein the output terminal of the error amplifier E1 is a PWM terminal T1. The output terminal of the first comparator COP1 is electrically connected to the modulation control circuit 220.

The output terminal of the zero-crossing detecting circuit ZT is connected to the modulation control circuit 220 and a control terminal of the compensation switch 51 in the modulation compensating circuit 270. The slope compensating circuit 240 is electrically connected to one terminal of the detection resistor RT, and the current detecting circuit 230 is electrically connected to the input terminal IT and one terminal of the detection resistor RT. One terminal of the detection resistor RT is electrically connected to a positive terminal of the first comparator COP1, and another terminal of the detection resistor RT is electrically connected to the ground voltage GND. One terminal of the compensation resistor ROP is electrically connected to another terminal of the compensation switch S1. A first terminal of the compensation capacitor COP is electrically connected to another terminal of the compensation resistor ROP, and a second terminal of the compensation capacitor COP is electrically connected to the ground voltage GND. The input terminal of the buffer B1 is electrically connected to the first terminal of the detection resistor RT, and the output terminal of the buffer B1 is PFM terminal T2. The input terminal of the second comparator COP2 is electrically connected to the output terminal of the error amplifier E1, the input terminal of the second comparator COP2 is electrically connected to the threshold voltage VTH, and the output terminal of the second comparator COP2 is electrically connected to the current detecting circuit 230 and the slope compensating circuit 240, wherein the threshold voltage VTH is a fixed voltage.

Figure 3:
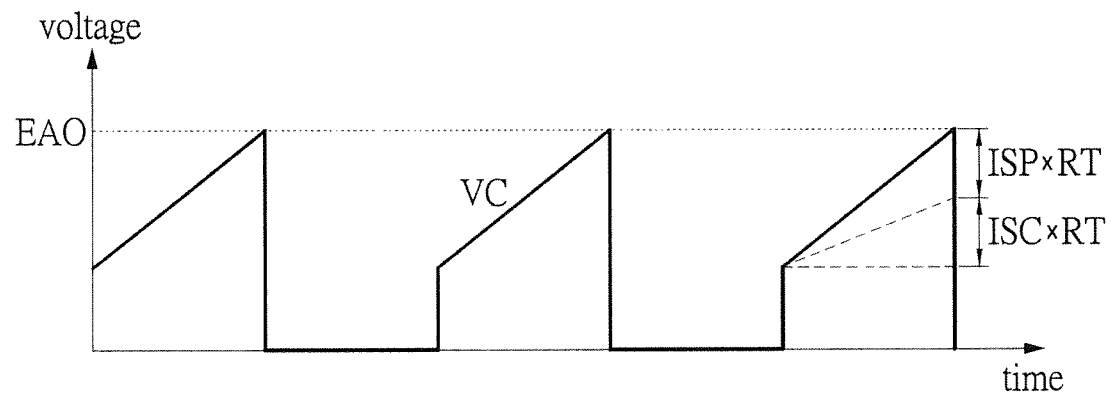
FIG. 3 shows a time-varying schematic view of the detection voltage to the embodiment of the instant disclosure.

In the present embodiment, the current-mode buck converter 200 receives the input voltage VIN through the input terminal IT, and outputs the output voltage VOUT through the output terminal OT. The feedback module 260 generates a feedback signal VFB according to the output voltage VOUT. Furthermore, the feedback module 260 receives the output voltage VOUT through the first resistor R1, and outputs the feedback signal VFB to the negative input terminal of the error amplifier E1, wherein voltage of the feedback signal VFB is a partial voltage of the output voltage VOUT, and ratio of the partial voltage is that resistor value of the second resistor R2 is divided by the sum of the first resistor R1 and the second resistor R2. The switch module 250 determines electric connection of the input terminal IT, the ground voltage GND and the output terminal OT according to the next-stage switch signal SWB. The current detecting circuit 230 amplifies an input current ISNP received so as to generate an image current ISP. The slope compensating circuit 240 receives a pre-stage switch signal SW so as to operate correspondingly according to the pre-stage switch signal SW, and accordingly generates the slope compensating current ISC. In the present embodiment, the current-mode buck converter 200 gathers image current ISP and the slope compensating current ISC together according to the adder AD and make it flow from the detection resistor RT to the ground voltage GND. Referring to FIGS. 2 and 3 concurrently, FIG. 3 shows that peak value of the sum of the image current ISP and the slope compensating current ISC may be changed with magnitude of the input voltage VIN and the output voltage VOUT. Next, the instant disclosure transforms a sum of the image current ISP and the slope compensating current ISC to the detection voltage VC through the detection resistor RT, wherein the detection voltage VC is electrically connected to the input terminal of the first comparator COP1 and the input terminal of the buffer B1. The error amplifier E1 is used for amplifying a difference of the feedback signal VFB and the first reference voltage VREF1 so as to generate a difference voltage ΔV. The modulation compensating circuit 270 compensates frequency response of the current-mode buck converter 200 so as to generate a compensation voltage EAO, wherein one terminal of the compensation switch S1 of the modulation compensating circuit 270 is switched and connected to one of the PWM terminal T1 and the PFM terminal T2.

Next, the first comparator COP1 receives the detection voltage VC and the compensation voltage EAO, and then compares the detection voltage VC with the compensation voltage EAO so as to generate the PWM signal PS, wherein the PWM signal PS is a signal generated by interacting peak value which is a sum of the compensation voltage, the image current and the slope compensating current. The second comparator COP2 receives the compensation voltage EAO and the threshold voltage VTH, and then compares the compensation voltage EAO with the threshold voltage VTH and accordingly generates the sleep-trigger signal SLE, which is transmitted to the current detecting circuit 230 and the slope compensating circuit 240. The modulation control circuit 220 is used for generating the pre-stage switch signal SW according to the PWM signal PS and the oscillation signal VOSC, wherein the oscillation signal VOSC is generated from the oscillator 210. The zero-crossing detecting circuit ZT is used for detecting a source current ISNN of the down-bridge switch transistor MN, and transmits the mode switch signal PF to the modulation control circuit 220 and the compensation switch S1 according to a comparison result. The buffer B1 receives the detection voltage VC and outputs the detection voltage VC to the PFM terminal T2. It is to be noted that when the current-mode buck converter 200 is in the pulse width modulation (PWM) mode, the buffer B1 is in a disable state. When the current-mode buck converter 200 is in the pulse frequency modulation (PFM) mode, the second comparator COP2 transmits the sleep-trigger signal SLE with low voltage level to current detecting circuit 230 and the slope compensating circuit 240 according to the comparison result of the compensation voltage EAO and the threshold voltage VTH, so as to enable or disable the current detecting circuit 230 and the slope compensating circuit 240.

In the following description is further instruction in teaching a work mechanism of the current-mode buck converter 200.

When the current-mode buck converter 200 enters into the PFM mode from the PWM mode, one terminal of the compensation switch S1 is switched and connected to the PFM terminal T2 from the PWM terminal T1 so as to receive the detection voltage VC and voltage level of the detection voltage VC is substantially close to or equal to voltage level of the compensation voltage EAO in the PWM mode; which means, the detection voltage VC is able to carry information related to the voltage of the compensation voltage EAO so as to reduce oscillation of the current-mode buck converter 200 switched between the PWM mode and the PFM mode. Furthermore, when the current-mode buck converter 200 is in the PWM mode, the zero-crossing detecting circuit ZT outputs the mode switch signal PF with low voltage level to the modulation control circuit 220 and the compensation switch S1 according to a detection result, so that one terminal of the compensation switch S1 is switched and connected to the PWM terminal T1. When the current-mode buck converter 200 is in the PFM mode, the zero-crossing detecting circuit ZT outputs the mode switch signal PF with high voltage level to the modulation control circuit 220 and a control terminal of the compensation switch S1 according to the detection result, so that one terminal of the compensation switch S1 is electrically connected to the PFM terminal T2, wherein the buffer B1 may output a detection voltage VC, and voltage level of the detection voltage VC is equal to voltage level of the compensation voltage EAO. It is worth noticing that, when the current-mode buck converter 200 enters into the PFM mode from the PWM mode, the second comparator COP2 transmits the sleep-trigger signal SLE with high voltage level to the current detecting circuit 230 and the slope compensating circuit 240 according to the comparison result of the compensation voltage EAO and the threshold voltage VTH (i.e. when the compensation voltage EAO is smaller than the threshold voltage VTH), so as to disable the current detecting circuit 230 and the slope compensating circuit 240; which means, the current detecting circuit 230 and the slope compensating circuit 240 may temporarily shut down work.

Regarding the switch module 250 in the present embodiment, people skilled in the arts should be understood that, the buffer amplifier 252 is used for amplifying the pre-stage switch signal SW so as to generate the next-stage switch signal SWB. The up-bridge switch transistor MP is used for receiving the next-stage switch signal SWB, and the down-bridge switch transistor MN is used for determining electric connection of the ground voltage GND and the output terminal according to an in-phase signal or an anti-phase signal of the next-stage switch signal SWB.

Accordingly, when the current-mode buck converter 200 of the instant disclosure is changed from the PWM mode to the PFM mode, i.e. one terminal of the compensation switch S1 is changed and connected to the PFM terminal T2 from the PWM terminal T1, the current-mode buck converter 200 is able to make one terminal of the compensation switch S1 be connected to the detection voltage VC so that voltage level of the compensating capacitor COP is equal to that of compensation voltage EAO and thus reduces switch loss of the current-mode buck converter 200 switched between the PWM mode and the PFM mode, and stabilizes the output voltage VOUT of the current-mode buck converter 200.

[One Embodiment of the Electronic System]

Figure 4:
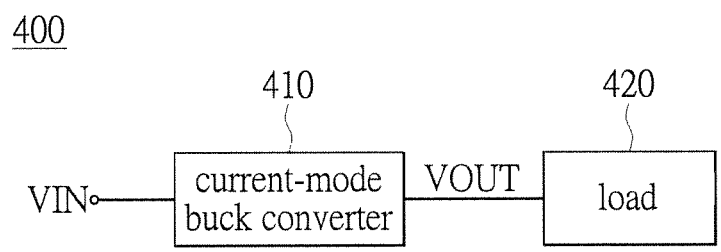
FIG. 4 shows block schematic view of the electronic system according to the embodiment of the instant disclosure.

Referring to FIG. 4, FIG. 4 shows block schematic view of the electronic system according to the embodiment of the instant disclosure. The electronic system 400 comprises a load 420 and the current-mode buck converter 410 connected to the load 420, wherein the current-mode buck converter 410 receives the input voltage VIN and makes the input voltage VIN be step down to the output voltage VOUT. The current-mode buck converter 410 may be the current-mode buck converter 200 in FIG. 2. In the present embodiment, through operation mechanism of the current-mode buck converter 410, the electronic system 400 is able to do that when the current-mode buck converter 410 is switched between the PFM mode and the PWM mode, switch loss of the electronic system 400 is reduced and the output voltage VOUT is maintained stably.

To sum up, the current-mode buck converter and the electronic system using the same provided by the instant disclosure is able to reduce switch loss when the current-mode buck converter is switched between the pulse width modulation mode and the pulse frequency modulation mode, and the output voltage of the current-mode buck converter is stabilized.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:
1. A current-mode buck converter, comprising:
an oscillator, generating an oscillation signal;
an input terminal, receiving an input voltage;
an output terminal, receiving an output voltage;
a feedback module, connected to the output terminal, and the feedback module generating a feedback signal according to the output voltage;
a switch module, determining an electric connection of the input terminal, ground voltage and the output terminal according to a next-stage switch signal;

a current detecting circuit, connected to the input terminal so as to receive an input current, for generating an image current;
a slope compensating circuit, receiving a pre-stage switch signal and accordingly generating a slope compensating current;
a detection resistor, having a first terminal electrically connected to the current detecting circuit and the slope compensating circuit, for transforming a sum of the image current and the slope compensating current to a detection voltage;
an error amplifier, connected to the feedback module, for amplifying a difference of the feedback signal and a first reference voltage so as to generate a difference voltage;
a modulation compensating circuit, connected to the error amplifier, for compensating frequency response of the current-mode buck converter according to the difference voltage and then generating a compensation voltage, wherein the modulation compensating circuit comprises:
a compensation switch, having a control terminal receiving a mode switch signal and accordingly making one terminal of the compensation switch be switched to one of a PWM terminal and a PFM terminal;
a compensation resistor, having one terminal connected to another terminal of the compensation switch; and
a compensation capacitor, having a first terminal connected to another terminal of the compensation resistor, having a second terminal connected the ground voltage,
a first comparator, having an non-positive input end electrically connected to the first terminal of the detection resistor to receive the detection voltage and comparing the detection voltage with the compensation voltage so as to generate a PWM signal accordingly;
a second comparator, receiving and comparing the compensation voltage with a threshold voltage, and transmitting a sleep-trigger signal with high voltage level to the current detecting circuit and the slope compensating circuit for disabling the current detecting circuit and the slope compensating circuit when the compensation voltage is smaller than the threshold voltage;
a modulation control circuit, connected to the oscillator, the slope compensating circuit, the first comparator and the second comparator, for generating the pre-stage switch signal according to the PWM signal and the oscillation signal;
a zero-crossing detecting circuit, connected to switch module, for detecting current; and
a buffer, having an input end electrically connected to the first terminal of the detection resistor and an output end electrically connected to the PFM terminal, to receive the detection voltage and output the detection voltage to the PFM terminal,
wherein when the current-mode buck converter enters into a pulse frequency modulation mode from a pulse width modulation mode, one terminal of the compensation switch is switched and connected to the PFM terminal from the PWM terminal for receiving the detection voltage, and voltage level of the detection voltage is equal to voltage level of the compensation voltage at this time, and thus reduces switch loss of the current-mode buck converter and stabilizes a transition between the pulse frequency modulation mode and the pulse width modulation mode.

2. The current-mode buck converter according to claim 1, wherein when current-mode buck converter is in the pulse width modulation mode, the zero-crossing detecting circuit outputs the mode switch signal with low voltage level to the modulation control circuit and the compensation switch, so that one terminal of the compensation switch is switched and connected to PWM terminal, and when the current-mode buck converter is in the pulse frequency modulation mode, the zero-crossing detecting circuit outputs the mode switch signal with high voltage level to the modulation control circuit and the compensation switch, so that one terminal of the compensation switch is switched and connected to the PFM terminal.

3. The current-mode buck converter according to claim 1, wherein when the compensation voltage is smaller than the threshold voltage, the second comparator transmits the sleep-trigger signal with high voltage level to the current detecting circuit and the slope compensating circuit so as to shut down work.

4. The current-mode buck converter according to claim 1, wherein the PWM signal is a signal generated by interacting peak value which is a sum of the compensation voltage, the image current and the slope compensating current.

5. The current-mode buck converter according to claim 1, wherein the switch module comprises:
a buffer amplifier, connected to the modulation control circuit, for amplifying the pre-stage switch signal so as to generate the next-stage switch signal;
an up-bridge switch transistor, connected to the input terminal and the buffer amplifier for receiving the next-stage switch signal; and
a down-bridge switch transistor, connected to the ground voltage and the buffer amplifier for receiving the next-stage switch signal, and the down-bridge switch transistor determining electric connection of the ground voltage and the output terminal according to an in-phase signal or an anti-phase signal.

6. The current-mode buck converter according to claim 5, wherein the up-bridge switch transistor is a P type metal-oxide semiconductor transistor and the down-bridge switch transistor is an N type metal-oxide semiconductor transistor.

7. The current-mode buck converter according to claim 1, wherein the feedback module comprises:
a first resistor, having one terminal connected to the output terminal for receiving the output voltage; and
a second resistor, having one terminal connected to another terminal of the first resistor and outputting the feedback signal to the error amplifier, having another terminal connected to the ground voltage,
wherein voltage of the feedback signal is partial voltage of the output voltage.

8. The current-mode buck converter according to claim 1, wherein the modulation control circuit generates the pre-stage switch signal according to the PWM signal and the oscillation signal when the PWM signal is in high voltage level.

9. The current-mode buck converter according to claim 1, wherein the threshold voltage is a fixed voltage.

10. An electronic system, comprising:
a current-mode buck converter, receiving an input voltage, and the input voltage being step down to output voltage; and
a load, connected to the current-mode buck converter for receiving the output voltage,
wherein the current-mode buck converter comprises:
an oscillator, generating an oscillation signal;
an input terminal, receiving an input voltage;
an output terminal, receiving an output voltage;

a feedback module, connected to the output terminal, and the feedback module generating a feedback signal according to the output voltage;
a switch module, determining an electric connection of the input terminal, ground voltage and the output terminal according to a next-stage switch signal;
a current detecting circuit, connected to the input terminal so as to receive an input current, for generating an image current;
a slope compensating circuit, receiving a pre-stage switch signal and accordingly generating a slope compensating current;
a detection resistor, having a first terminal electrically connected to the current detecting circuit and the slope compensating circuit, for transforming a sum of the image current and the slope compensating current to a detection voltage;
an error amplifier, connected to the feedback module, for amplifying a difference of the feedback signal and a first reference voltage so as to generate a difference voltage;
a modulation compensating circuit, connected to the error amplifier, for compensating frequency response of the current-mode buck converter according to the difference voltage and then generating a compensation voltage, wherein the modulation compensating circuit comprises:
　a compensation switch, having a control terminal receiving a mode switch signal and accordingly making one terminal of the compensation switch be switched to one of a PWM terminal and a PFM terminal;
　a compensation resistor, having one terminal connected to another terminal of the compensation switch; and
　a compensation capacitor, having a first terminal connected to another terminal of the compensation resistor, having a second terminal connected the ground voltage,
a first comparator, having an non-positive input end electrically connected to the first terminal of the detection resistor to receive the detection voltage and comparing the detection voltage with the compensation voltage so as to generate a PWM signal accordingly;
a second comparator, receiving and comparing the compensation voltage with a threshold voltage, and transmitting a sleep-trigger signal with high voltage level to the current detecting circuit and the slope compensating circuit for disabling the current detecting circuit and the slope compensating circuit when the compensation voltage is smaller than the threshold voltage;
a modulation control circuit, connected to the oscillator, the slope compensating circuit, the first comparator and the second comparator, for generating the pre-stage switch signal according to the PWM signal and the oscillation signal;
a zero-crossing detecting circuit, connected to switch module, for detecting current; and
a buffer, having an input end electrically connected to the first terminal of the detection resistor and an output end electrically connected to the PFM terminal, to receive the detection voltage and output the detection voltage to the PFM terminal,
wherein when the current-mode buck converter enters into a pulse frequency modulation mode from a pulse width modulation mode, one terminal of the compensation switch is switched and connected to the PFM terminal from the PWM terminal for receiving the detection voltage, and voltage level of the detection voltage is equal to voltage level of the compensation voltage at this time, and thus reduces switch loss of the current-mode buck converter and stabilizes a transition between the pulse frequency modulation mode and the pulse width modulation mode.

11. The electronic system according to claim 10, wherein when current-mode buck converter is in the pulse width modulation mode, the zero-crossing detecting circuit outputs the mode switch signal with low voltage level to the modulation control circuit and the compensation switch, so that one terminal of the compensation switch is switched and connected to PWM terminal, and when the current-mode buck converter is in the pulse frequency modulation mode, the zero-crossing detecting circuit outputs the mode switch signal with high voltage level to the modulation control circuit and the compensation switch, so that one terminal of the compensation switch is switched and connected to the PFM terminal.

12. The electronic system according to claim 10, wherein when the compensation voltage is smaller than the threshold voltage, the second comparator transmits the sleep-trigger signal with high voltage level to the current detecting circuit and the slope compensating circuit so as to shut down work.

13. The electronic system according to claim 10, wherein the PWM signal is a signal generated by interacting peak value which is a sum of the compensation voltage, the image current and the slope compensating current.

14. The electronic system according to claim 10, wherein the switch module comprises:
　a buffer amplifier, connected to the modulation control circuit, for amplifying the pre-stage switch signal so as to generate the next-stage switch signal;
　an up-bridge switch transistor, connected to the input terminal and the buffer amplifier for receiving the next-stage switch signal; and
　a down-bridge switch transistor, connected to the ground voltage and the buffer amplifier for receiving the next-stage switch signal, and the down-bridge switch transistor determining electric connection of the ground voltage and the output terminal according to an in-phase signal or an anti-phase signal.

15. The electronic system according to claim 14, wherein the up-bridge switch transistor is a P type metal-oxide semiconductor transistor and the down-bridge switch transistor is an N type metal-oxide semiconductor transistor.

16. The electronic system according to claim 10, wherein the feedback module comprises:
　a first resistor, having one terminal connected to the output terminal for receiving the output voltage; and
　a second resistor, having one terminal connected to another terminal of the first resistor and outputting the feedback signal to the error amplifier, having another terminal connected to the ground voltage,
　wherein voltage of the feedback signal is partial voltage of the output voltage.

17. The electronic system according to claim 10, wherein the modulation control circuit generates the pre-stage switch signal according to the PWM signal and the oscillation signal when the PWM signal is in high voltage level.

18. The electronic system according to claim 10, wherein the threshold voltage is a fixed voltage.

* * * * *